United States Patent
Helwani et al.

(10) Patent No.: US 10,504,245 B2
(45) Date of Patent: Dec. 10, 2019

(54) IMAGE PROCESSING DEVICE AND METHOD FOR COLOR BALANCING

(71) Applicant: Huawei Technologies Co., Ltd., Shenzhen (CN)

(72) Inventors: Karim Helwani, Munich (DE); Lukasz Kondrad, Munich (DE); Nicola Piotto, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 15/651,673

(22) Filed: Jul. 17, 2017

(65) Prior Publication Data

US 2017/0316585 A1 Nov. 2, 2017

Related U.S. Application Data

(63) Continuation of application No. PCT/EP2015/055637, filed on Mar. 18, 2015.

(51) Int. Cl.
*G06T 7/00* (2017.01)
*H04N 9/73* (2006.01)
(Continued)

(52) U.S. Cl.
CPC .............. *G06T 7/97* (2017.01); *G06T 7/90* (2017.01); *H04N 1/486* (2013.01);
(Continued)

(58) Field of Classification Search
CPC ... G06T 7/97; G06T 7/90; G06T 2207/10024; G06T 2207/10152; G06T 2207/20221;
(Continued)

(56) References Cited

U.S. PATENT DOCUMENTS

2003/0234866 A1* 12/2003 Cutler .................... G06T 5/008
348/207.1
2004/0252884 A1 12/2004 Foote et al.
(Continued)

FOREIGN PATENT DOCUMENTS

CN 101088278 A 12/2007
CN 101960860 A 1/2011
(Continued)

OTHER PUBLICATIONS

Ilie et al., "Ensuring Color Consistency across Multiple Cameras," Proceedings of the Tenth IEEE International Conference on Computer Vision (ICCV'05), Institute of Electrical and Electronic Engineers, New York, New York (Oct. 17, 2005).
(Continued)

*Primary Examiner* — Ping Y Hsieh
(74) *Attorney, Agent, or Firm* — Leydig, Voit & Mayer, Ltd.

(57) ABSTRACT

An image processing device performing color balancing of a first image and at least a second image is provided. The image processing device comprises a color balancing determination unit and a color balancing calculation unit.
The color balancing determination unit determines a global gain vector (t) comprising at least two gain factors ($\hat{a}^n$, $\hat{a}^{n+1}$) of the first and second images by minimizing a cost function based upon reference pixel values of the first and second images. The first and second image reference pixels depict a shared color scene of the two images.
The color balancing calculation unit performs color balancing of the first image based upon the gain factor ($\hat{a}^n$) of the first image and to perform a color balancing of the second image based upon the gain factor ($\hat{a}^{n+1}$) of the second image.

13 Claims, 5 Drawing Sheets

(51) Int. Cl.
*H04N 17/00* (2006.01)
*G06T 7/90* (2017.01)
*H04N 1/48* (2006.01)
*H04N 1/60* (2006.01)
*H04N 5/247* (2006.01)
*H04N 13/243* (2018.01)
*H04N 13/246* (2018.01)
*H04N 13/257* (2018.01)

(52) U.S. Cl.
CPC ......... *H04N 1/6077* (2013.01); *H04N 1/6086* (2013.01); *H04N 5/247* (2013.01); *H04N 9/735* (2013.01); *H04N 13/243* (2018.05); *H04N 13/246* (2018.05); *H04N 13/257* (2018.05); *H04N 17/002* (2013.01); *G06T 2207/10024* (2013.01); *G06T 2207/10152* (2013.01); *G06T 2207/20221* (2013.01)

(58) Field of Classification Search
CPC .. H04N 13/257; H04N 13/246; H04N 13/243; H04N 1/486; H04N 1/6077; H04N 1/6086; H04N 5/247; H04N 9/735; H04N 17/002
See application file for complete search history.

(56) References Cited

U.S. PATENT DOCUMENTS

| | | | |
|---|---|---|---|
| 2006/0092441 A1* | 5/2006 | Quan | .................. H04N 1/6077 358/1.9 |
| 2006/0268131 A1 | 11/2006 | Cutler | |
| 2009/0147100 A1* | 6/2009 | Nagamasa | ............. H04N 5/222 348/223.1 |
| 2011/0044531 A1* | 2/2011 | Zhang | ....................... G06T 5/50 382/154 |
| 2014/0176757 A1* | 6/2014 | Rivard | ................. H04N 5/2354 348/223.1 |

FOREIGN PATENT DOCUMENTS

| | | |
|---|---|---|
| CN | 103079076 A | 5/2013 |
| JP | 2004054928 A | 2/2004 |
| JP | 2004088247 A | 3/2004 |
| JP | 2005004776 A | 1/2005 |
| JP | 2007329555 A | 12/2007 |
| JP | 2009147464 A | 7/2009 |

OTHER PUBLICATIONS

Tehrani et al., "Iterative colour correction of multicamera systems using corresponding feature points," J. Vis. Commun. Image R., Science Direct, pp. 377-391, Elsevier Inc., (2010).

"ColorChecker," pp. 1-4, Wikipedia, http://en.wikipedia.org/wiki/ColorChecker (Accessed on Nov. 27, 2014).

Xiong et al., "Fast Panorama Stitching for High-Quality Panoramic Images on Mobile Phones," IEEE Transactions on Consumer Electronics, vol. 56, No. 2, pp. 298-306, Institute of Electrical and Electronic Engineers, New York, New York (May 2010).

* cited by examiner

IMAGE PROCESSING DEVICE AND METHOD FOR COLOR BALANCING

CROSS-REFERENCE TO RELATED APPLICATIONS

This application is a continuation of International Application No. PCT/EP2015/055637, filed on Mar. 18, 2015, the disclosure of which is hereby incorporated by reference in its entirety.

TECHNICAL FIELD

The disclosure relates to an imaging system, an image processing device and an image processing method, which each perform a color balancing of images.

BACKGROUND

The capability of reliably balancing color gamut between cameras with different characteristics is a significant need for many application domains. When dealing with panoramic image formation, i.e., image stitching, the availability of color balanced input images is particularly crucial, since the human vision system is incredibly skilled in spotting color differences in adjacent images.

Exemplary color balancing methods fall in 2 categories:
Hardware camera register calibration,
Camera image post-processing.

The methods in the first category modify the internal camera registers, e.g., gain, exposure, etc., in order to obtain some desired color response. The general idea of the hardware calibration is to use a general optimizer to search the space of each camera's hardware register values for a state with the closest match between the colors of a target image and the camera image of the color chart. For each camera, the optimizer repeatedly adjusts the register values, acquires an image, and computes the cost. The optimizer typically runs until all the cameras are close enough to the target image, or until there is no significant improvement from the previous iteration. Hardware camera register calibration, however, is typically insufficient to achieve color consistency, because their range and precision are often inadequate.

Therefore, methods of the second category, where images after the acquisition are processed and color a calibration is performed, are desirable. Those methods provide a more precise refinement.

Additionally, a combination of the two mentioned classes could be considered, where both camera internal register calibration and image post-processing refinement are applied.

The above-mentioned exemplary color balancing approaches though suffer from a number of problems:
They perform the color calibration only with respect to a known target containing standardized color samples
In case the system has to be re-calibrated, e.g., illumination conditions of the working environment changed, the necessity of using a pre-defined pattern represents a lack of flexibility
The cameras to be calibrated need to have an overlapping field of view. The overlapping area between the cameras that have to be color balanced has to be large enough to contain the color calibration pattern. Or if there is no calibration pattern, then only a color matching is performed between two cameras, but not balancing of the color gamut.
In large camera arrays, where the shared field of view is minimized, this requirement is a strict constraint.

SUMMARY

In this disclosure, a novel technique for balancing the color gamut between camera pairs is proposed. The device and method do not require the use of reference color patterns and advantageously assume a simple linear model, which due to a very fast solution estimation allows for coping with real-time constraints in an online scenario, for example, real-time dynamic color balancing.

In order to overcome the issues of the earlier explained exemplary approaches, concerning the use of a know color chart and the necessity of sharing some portion of the field of view for the cameras to be balanced, the following technology is proposed.

Due to production inaccuracies, noise, and other factors, even cameras of the very same model/manufacturer will most likely have a different color gamut.

The goal is to transform the color gamut of each camera in such a way that:
the difference between the transformed color gamut is minimized
the transformed color gamut of each camera tends to the reference colors The proposed approach does not need the use of a color chart, i.e., the knowledge of a reference color is not necessarily required for the balancing The approach only requires each camera to grab a picture of the same scene, not necessarily of a color chart.

The input/output is represented by a linear model, allowing for a very fast parameter estimation, and short processing time.

Fast processing allows for real-time continuous color calibration for balancing dynamic environmental illumination conditions.

Accordingly, an object of the present disclosure is to provide an apparatus and method, which allow for an accurate color calibration without requiring the use of a calibration target.

An object is solved by the features of claim 1 for the apparatus, claim 9 for the system, and claim 13 for the method. Further it is solved by the features of claim 14 for the associated computer program. The dependent claims contain further developments.

According to a first aspect of the disclosure, an image processing device for performing a color balancing of at least a first image recorded by a first camera and a second image recorded by a second camera is provided. The image processing device comprises a color balancing determination unit and a color balancing calculation unit. The color balancing determination unit is adapted to determine a global gain vector comprising at least one gain factor of the first image and at least one gain factor of the second image by minimizing a pre-determined cost function based upon reference pixel values of the first image and reference pixel values of the second image. The first and second image reference pixels therein depict a shared color scene of the first and second images. The color balancing calculation unit is adapted to perform a color balancing of the first image based upon the at least one gain factor of the first image and to perform a color balancing of the second image based upon the at least one gain factor of the second image. It is thereby possible to perform a color balancing without the need for taking images of a color chart or a reference pattern.

According to a first implementation form of the first aspect, the first image and the second image each comprise at least three color channels. The balancing determination unit is then adapted to minimize separate cost functions for each color channel of the images. The color balancing calculation unit is then adapted to perform the color balancing of the first image separately for each color channel and to perform the color balancing of the second image separately for each color channel. It is thereby possible to process color images.

According to a second implementation form of the first aspect, the shared color scene of the first image and the second image is a scene that captures at least one same object or area. The at least one same object or area is within a shared field of view of the first camera and the second camera. It is thereby possible to perform an even more accurate color balancing.

Alternatively, in a third implementation form of the first aspect, the shared color scene of the first image and the second image is a scene that captures at least one same color. The at least one same color is not within a shared field of view of the first camera and the second camera. It is thereby possible to perform a color balancing, even if the respective cameras do not have a shared field of view.

According to a fourth implementation form of the first aspect, the image processing device is adapted to perform a color balancing of at least the first image recorded by the first camera, the second image recorded by the second camera and a third image recorded by a third camera. The color balancing determination unit is adapted to, after the color balancing calculation unit has performed the color balancing of the first image and the second image, resulting in a color balanced first image and a color balanced second image to determine a further global gain vector comprising at least one further gain factor of the second image and at least one gain factor of the third image by minimizing a pre-determined cost function based upon reference pixel values of the second color balanced image and reference pixel values of the third image. The reference pixel of the color balanced second image and the third image depict a shared color scene of the color balanced second image and third image. The color balancing calculation unit is then adapted to perform a color balancing of the second color balanced image based upon the at least one further gain factor of the second image and to perform a color balancing of the third image based upon the at least one gain factor of the third image. It is thereby possible to perform a color balancing of more than two images.

According to a fifth implementation form of the first aspect, the minimizing of the pre-determined cost function comprises setting up formulas $$y_j^{(1)} = a^{(1)} \cdot x_j \quad (1),$$

$$y_j^{(2)} = a^{(2)} \cdot x_j \quad (2),$$

wherein j is a pixel number, $y_j^{(1)}$ is a value of pixel number j measured by the first camera, $y_1^{(2)}$ is a value of pixel number j measured by the second camera, $x_j$ is a reference color value of the pixel j, $a^{(1)}$ is a gain factor by which $x_j$ has to be multiplied to reach $y_j^{(1)}$, and $a^{(2)}$ is a gain factor by which $x_1$ has to be multiplied to reach $y_j^{(2)}$, multiplying formula (1) by $a^{(2)}$ and multiplying formula (2) by $a^{(1)}$, achieving $$y_j^{(1)} \cdot a^{(2)} = a^{(1)} \cdot x_j \cdot a^{(2)},$$

$$y_j^{(2)} \cdot a^{(1)} = a^{(2)} \cdot x_j \cdot a^{(1)},$$

subtracting the resulting formulas, achieving $$y_j^{(1)} \cdot a^{(2)} - y_j^{(2)} \cdot a^{(1)} = 0$$

determining the cost function as $$J = [y_j^{(1)} \; y_j^{(2)}][a^{(2)} \; -a^{(1)}]^T \quad (3).$$

According to a sixth implementation form of the first aspect, minimizing the pre-determined cost function comprises minimizing $$J = [yj(1) \; yj(2)][a(2) - a(1)]^T,$$

wherein j is a pixel number, yj(1) is a value of pixel number j measured by the first camera, y1(2) is a value of pixel number j measured by the second camera, a(1) is a gain factor by which a reference color value of the pixel j has to be multiplied to equal yj(1), and a(2) is a gain factor by which the reference color value of the pixel j has to be multiplied to equal yj(2).

A very efficient color balancing is thereby possible.

In a seventh implementation form according to the fifth or sixth implementation forms of the first aspect, a global gain vector t is assumed to achieve $$J = Y \cdot t \quad (4), \text{ where}$$

$$Y = [y^{(1)} \; y^{(2)}] \quad (5),$$

$$y^{(n)} = [y_1^{(n)} \ldots y_i^{(n)} \ldots y_1^{(n)}]^T \quad (6), \text{ and}$$

$$t = [a^{(2)} \; -a^{(1)}]^T \quad (7),$$

wherein t is the global gain vector, Y is a vector of values y measured for a single pixel by first camera and the second camera, n is a pixel number, i is an intermediary pixel number, and 1 is a last pixel number, and minimizing the pre-determined cost function comprises determining a non-trivial nullspace of a matrix $R_{yy} = Y^T \cdot Y$ by preferably performing an eigenvalue decomposition of $R_{yy}$ $$Ryy = \hat{A} \cdot Ryy \cdot \hat{A}^T \quad (8),$$

wherein Ryy is a diagonal matrix with the eigenvalues at its main diagonal, and Â is a unitary matrix, and using the eigenvector with the smallest eigenvalue $\hat{t}$ as the first color balancing information $\hat{a}^{(1)}$ and the second color balancing information $\hat{a}^{(2)}$, wherein $$\hat{t} = [\hat{a}^{(2)} \; -\hat{a}^{(1)}]^T.$$

An even greater accuracy of the color balancing can thereby be achieved.

In an eighth implementation form according to the seventh implementation form of the first aspect, performing of the color balancing comprises dividing pixel values $y_j^{(1)}$ of the first camera by the gain factor $\hat{a}^{(1)}$, and dividing pixel values $y_j^{(2)}$ of the second camera by the gain factor $\hat{a}^{(2)}$.

A low computational complexity color balancing is thereby possible.

According to a second aspect of the disclosure, an imaging system comprising an image processing device according to the first aspect or one of the implementation forms of the first aspect and at least a first camera and a second camera is provided. It is thereby possible to record and color balance the images.

According to a first implementation form of the second aspect, the first camera and the second camera have an at least partially shared field of view. It is thereby possible to perform an especially accurate color balancing.

According to a second implementation form of the second aspect, the imaging system comprises a third camera. It is thereby possible to perform image recording and color balancing of the recorded images by more than two cameras.

In a third implementation form according to the second implementation form of the second aspect, each of the cameras has at least a partially shared field of view with at least one further of the cameras. Also with more than two cameras, it is possible to achieve an especially accurate color balancing thereby.

According to a third aspect of the present disclosure, an image processing method for performing a color balancing of a first image recorded by a first camera and a second image recorded by a second camera is provided. The method comprises determining a global gain vector comprising at least one gain factor of the first image and at least one gain factor of the second image by minimizing a pre-determined cost function based upon reference pixel values of the first image and reference pixel values of the second image, wherein the first and second image reference pixels depict a shared color scene of the first and second images. Moreover, the method comprises performing a color balancing of the first image based upon the at least one gain factor of the first image and performing a color balancing of the second image based upon the at least one gain factor of the second image. It is thereby possible to perform a low computational complexity high accuracy color balancing without the necessity of a reference pattern.

According to a first implementation form of the third aspect, the first image and the second image each comprise at least three color channels. Separate cost functions are minimized for each color channel of the images. The color balancing of the first image and of the second image are performed separately for each color channel. It is thereby possible to process color images.

According to a second implementation form of the third aspect, the shared color scene of the first image and the second image is a scene that captures at least one same object or area. The at least one same object or area is within a shared field of view of the first camera and the second camera. It is thereby possible to perform an even more accurate color balancing.

Alternatively, in a third implementation form of the third aspect, the shared color scene of the first image and the second image is a scene that captures at least one same color. The at least one same color is not within a shared field of view of the first camera and the second camera. It is thereby possible to perform a color balancing, even if the respective cameras do not have a shared field of view.

According to a fourth implementation form of the third aspect, a color balancing of at least the first image recorded by the first camera, the second image recorded by the second camera and a third image recorded by a third camera are performed. After the color balancing of the first image and the second image, resulting in a color balanced first image and a color balanced second image has been performed, a further global gain vector comprising at least one further gain factor of the second image and at least one gain factor of the third image is determined by minimizing a pre-determined cost function based upon reference pixel values of the second color balanced image and reference pixel values of the third image. The reference pixel of the color balanced second image and the third image depict a shared color scene of the color balanced second image and third image. A color balancing of the second color balanced image is then performed based upon the at least one further gain factor of the second image. A color balancing of the third image is performed based upon the at least one gain factor of the third image. It is thereby possible to perform a color balancing of more than two images.

According to a fifth implementation form of the third aspect, the minimizing of the pre-determined cost function comprises
setting up formulas $$y_j^{(1)} = a^{(1)} \cdot x_j \quad (1),$$

$$y_j^{(2)} = a^{(2)} \cdot x_j \quad (2),$$

wherein j is a pixel number, $y_j^{(1)}$ is a value of pixel number j measured by the first camera, $y_1^{(2)}$ is a value of pixel number j measured by the second camera, $x_j$ is a reference color value of the pixel j, $a^{(1)}$ is a gain factor by which $x_j$ has to be multiplied to reach $y_j^{(1)}$, and $a^{(2)}$ is a gain factor by which $x_1$ has to be multiplied to reach $y_j^{(2)}$,
multiplying formula (1) by $a^{(2)}$ and multiplying formula (2) by $a^{(1)}$, achieving $$y_j^{(1)} \cdot a^{(2)} = a^{(1)} \cdot x_j \cdot a^{(2)},$$

$$y_j^{(2)} \cdot a^{(1)} = a^{(2)} \cdot x_j \cdot a^{(1)},$$

subtracting the resulting formulas, achieving $$y_j^{(1)} \cdot a^{(2)} - y_j^{(2)} \cdot a^{(1)} = 0$$

determining the cost function as $$J'[y_j^{(1)} \, y_j^{(2)}][a^{(2)} \, -a^{(1)}]^T \quad (3).$$

According to a sixth implementation form of the third aspect, the minimizing the pre-determined cost function comprises:
determining the cost function as $$J' = [yj(1) \, yj(2)][a(2) - a(1)]^T,$$

wherein j is a pixel number, yj(1) is a value of pixel number j measured by the first camera, y1(2) is a value of pixel number j measured by the second camera, a(1) is a gain factor by which a reference color value of the pixel j has to be multiplied to equal yj(1), and a(2) is a gain factor by which the reference color value of the pixel j has to be multiplied to equal yj(2).

A very efficient color balancing is thereby possible.

In a seventh implementation form according to the fifth or sixth implementation forms of the third aspect,
a global gain vector t is assumed to achieve $$J = Y \cdot t \quad (4),$$

$$Y = [y^{(1)} \, y^{(2)}] \quad (5),$$

$$y^{(n)} = [y_1^{(n)} \ldots y_i^{(n)} \ldots y_1^{(n)}]^T \quad (6),$$

$$t = [a^{(2)} \, -a^{(1)}]^T \quad (7),$$

wherein t is the global gain vector, Y is a vector of values y measured for a single pixel by first camera and the second camera, n is a pixel number, i is an intermediary pixel number, and 1 is a last pixel number, and minimizing the pre-determined cost function comprises
determining a non-trivial nullspace of a matrix $R_{yy} = Y^T \cdot Y$ by preferably performing an eigenvalue decomposition of $R_{yy}$, $$R_{yy} = \hat{A} \cdot R_{yy} \cdot \hat{A}^T \quad (8),$$

wherein Ryy is a diagonal matrix with the eigenvalues at its main diagonal, and Â is a unitary matrix, and using the eigenvectors with the smallest eigenvalues $\hat{t}$ as the first color balancing information $\hat{a}^{(1)}$ and the second color balancing information $\hat{a}^{(2)}$, wherein $$\hat{t}=[\hat{a}^{(2)} -\hat{a}^{(1)}]^T.$$

An even greater accuracy of the color balancing can thereby be achieved.

According to an eighth implementation form according to the seventh implementation form of the third aspect, performing of the color balancing comprises dividing pixel values $y_j^{(1)}$ of the first camera by the gain factor $\hat{a}^{(1)}$, and dividing pixel values $y_j^{(2)}$ of the second camera by the gain factor $\hat{a}^{(2)}$.

A low computational complexity color balancing is thereby possible.

According to a fourth aspect of the present disclosure, a computer program with a program code for performing the earlier described method when the computer program runs on a computer is provided.

Generally, it has to be noted that all arrangements, devices, elements, units and means and so forth described in the present application could be implemented by software or hardware elements or any kind of combination thereof. Furthermore, the devices may be processors or may comprise processors, wherein the functions of the elements, units and means described in the present applications may be implemented in one or more processors. All steps which are performed by the various entities described in the present application as well as the functionality described to be performed by the various entities are intended to mean that the respective entity is adapted to or configured to perform the respective steps and functionalities. Even if in the following description or specific embodiments, a specific functionality or step to be performed by a general entity is not reflected in the description of a specific detailed element of that entity which performs that specific step or functionality, it should be clear for a skilled person that these methods and functionalities can be implemented in respect of software or hardware elements, or any kind of combination thereof.

BRIEF DESCRIPTION OF DRAWINGS

The present disclosure is in the following explained in detail in relation to embodiments of the disclosure in reference to the enclosed drawings, in which.

DESCRIPTION OF EMBODIMENTS

Figure 1:
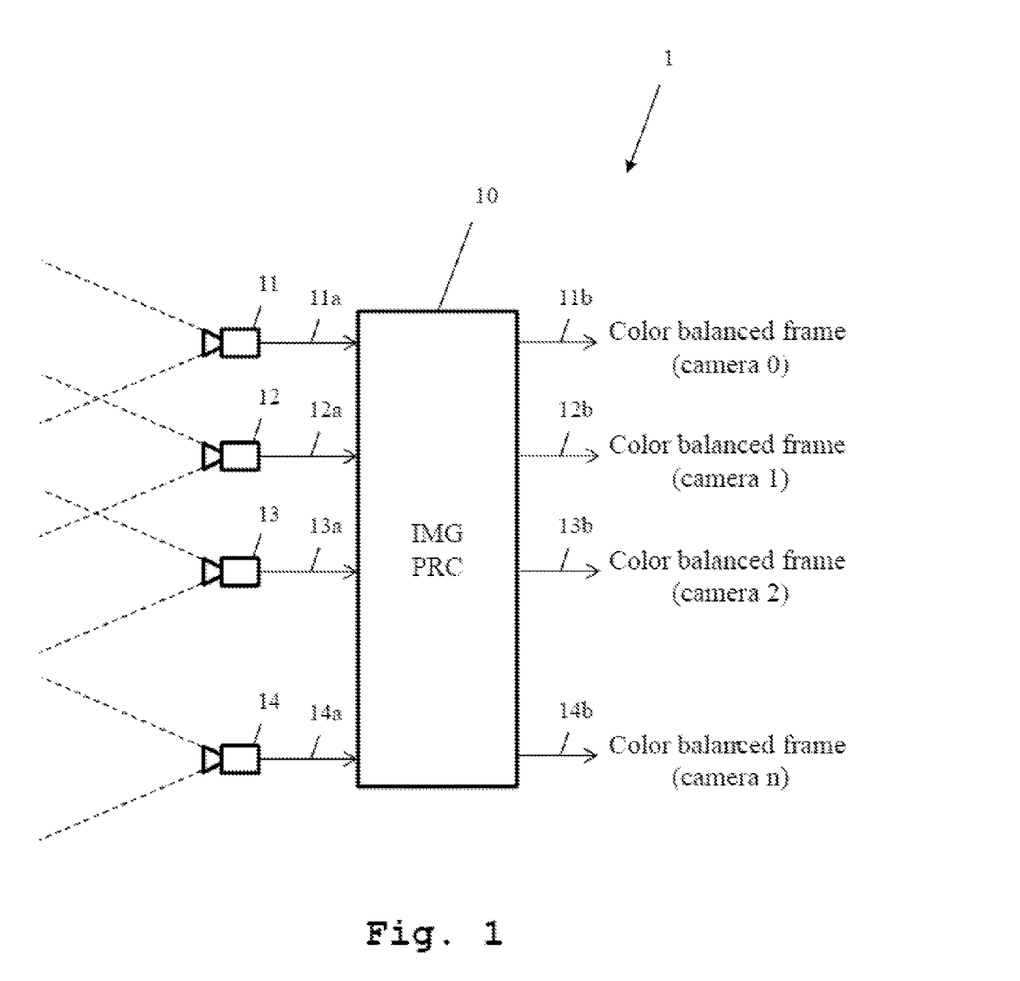
FIG. 1 shows an overview of an embodiment of the imaging system according to the second aspect of the disclosure in a block diagram.

First we demonstrate the general construction and function of the imaging system and image processing device according to the first and second aspects of the disclosure along FIG. 1. Along FIGS. 2-4 we further elaborate on the construction and function of the respective aspects of the disclosure. Finally, with regard to FIG. 5, the function of an embodiment of the inventive method according to the third aspect is described. Similar entities and reference numbers in different figures have been partially omitted.

In FIG. 1, an embodiment of the inventive imaging system 1 according to the second aspect of the disclosure is shown. The imaging system 1 comprises a plurality of cameras 11, 12, 13 and 14 and an image processing device 10 according to the first aspect of the disclosure. The cameras 11-14 are connected to the image processing device 10. Images 11a, 12a, 13a and 14a generated by the cameras 11, 12, 13 and 14 are handed to the image processing device 10 by the cameras 11-14. The image processing device 10 performs a color balancing of the individual images 11a-14a and generates color balanced images 11b, 12b, 13b and 14b. For performing the color balancing, pairs of images sharing at least a color scene depicting reference pixels are formed between the images 11a-14a. A color balancing of the respective pairs is performed. After the color balancing of the pairs has been performed, further color balancing between the already color balanced images of the pairs are performed. Regarding the color balancing of more than two images, it is referred to the elaborations regarding FIG. 3 and FIG. 4. Further details regarding the color balancing of the pairs of images, it is referred to the elaborations regarding FIG. 2.

Figure 2:
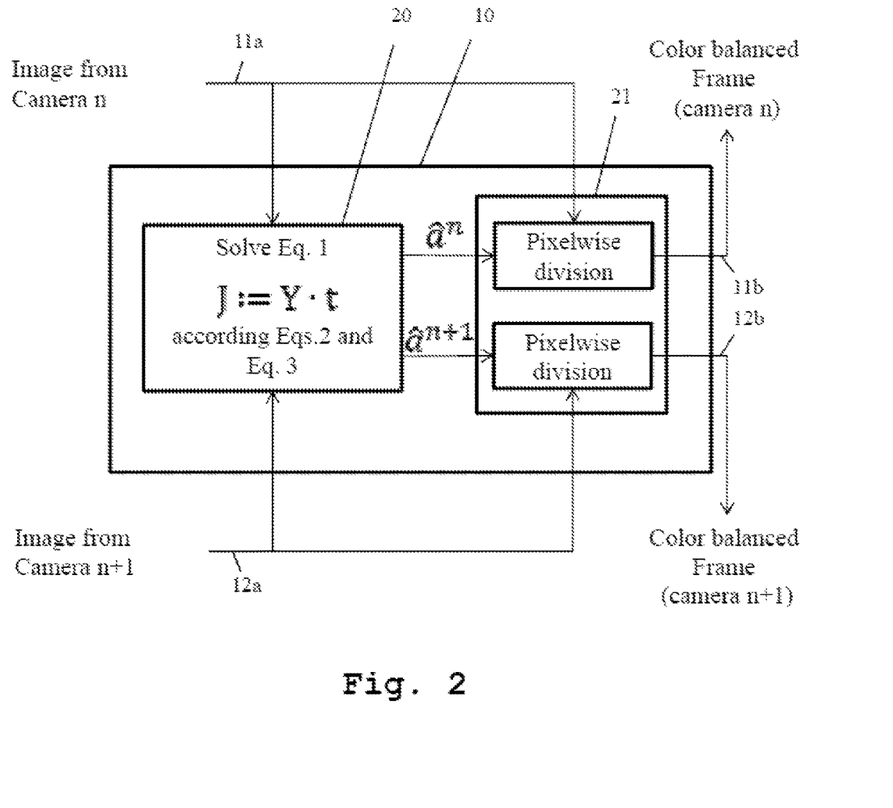
FIG. 2 shows an embodiment of the image processing device according to the first aspect of the present disclosure in a block diagram.

In FIG. 2, an embodiment of the image processing device 10 of the first aspect of the disclosure is shown. The image processing device 10 comprises a balancing determination unit 20 and connected to it a color balancing calculation unit 21.

A first image 11a generated by a first camera 11 and a second image 12a generated by a second camera 12 are provided to the color balancing determination unit 20. The first image 11a and the second image 12a each comprise reference pixels depicting a shared color scene of the first and second images. A color scene is the spectral radiances of a view of the natural world as measured from one or more vantage points in space. A shared color scene is a scene or scene portion that captures at least one same object or area within a shared view of the first camera 11 and the second camera 12 or captures at least one same color that may not be within a shared field of view (e.g., different areas of a uniformly blue sky).

The color balancing determination unit 20 determines a global gain vector t comprising at least one gain factor $\hat{a}n$ of the first image 11a and at least one gain factor $\hat{a}n+1$ of the second image 12a by minimizing a pre-determined cost function based upon the reference pixel values. These gain factors are handed on to the color balancing calculation unit 21, which performs a color balancing of the first image 11a and the second image 12a by dividing the pixel values of the first image 11a by the gain factor $\hat{a}n$ and by dividing the pixel values of the second image 12a by the gain factor $\hat{a}n+1$. Resulting from this calculation by the color balancing calculation unit 21 is a first color balanced image 11b and a second color balanced image 12b.

In the following, the detailed mathematics performed within the color balancing determination unit 20 and color balancing calculation unit 21 are shown.

Assuming a number of J=2 cameras, the output of each camera in each channel is given as a set of pixels $y_i^{(n)}$ with $$y_i^{(1)}=a^{(1)}\cdot x_i, \quad (1)$$

$$y_i^{(2)}=a^{(2)}\cdot x_i, \quad (2)$$

where $x_i$ is denoting the i-th pixel of a reference image (e.g., a "true" color value of an object) and $x_i \in \{x_{i,r}, x_{i,g}, x_{i,b}\}$ where the indices r, g, and b corresponds to the camera color channels, red, green, and blue respectively or also some other color basis such as {HSV}, {YUV}, etc.

The superscript denotes the camera index. Accordingly, $a^{(j)} \in \{a_r^{(j)}, a_g^{(j)}, a_b^{(j)}\}$, with $j \in \{1, \ldots, J\}$.

To calibrate the cameras to the common reference multichannel image which is represented by the pixels $x_i$, identify the channels gain factors $a_i$.

Multiplying the output of each camera by the gain of the other one leads to an identical quantity. Hence, in our approach, we minimize quantity $$J' := \begin{bmatrix} y_i^{(1)} & y_i^{(2)} \end{bmatrix} \begin{bmatrix} a^{(2)} \\ -a^{(1)} \end{bmatrix}. \tag{3}$$

In the assumed model, a global channel gain factor has to be determined for all pixels of a reference image. Let us define $$J := Y \cdot t, \tag{4}$$

Where $$Y := [y^{(1)} \ y^{(2)}], \tag{5}$$

$$y^{(n)} := [y_1^{(n)} \ldots y_i^{(n)} \ldots y_l^{(n)}]^T, \tag{6}$$

a vector built up with the pixel values, and $\{\cdot\}^T$ is denoting the transponation operator, and $$t := \begin{bmatrix} a^{(2)} \\ -a^{(1)} \end{bmatrix}. \tag{7}$$

Minimizing the energy of the vector is equivalent to determine the non-trivial nullspace of the matrix $R_{YY} := Y^T Y$. We determine this, preferably, by an eigenvalue decomposition of the $R_{YY}$.

$$R_{YY} = \hat{A} \overline{R}_{YY} \hat{A}^T, \tag{8}$$

where $\overline{R}_{YY}$ is a diagonal matrix with the eigenvalues at its main diagonal, and $\hat{A}$ is a unitary matrix.

The nullspace is spanned by the eigenvectors corresponding to the zero-valued eigenvalues $$\hat{t} =: \begin{bmatrix} \hat{a}^{(2)} \\ -\hat{a}^{(1)} \end{bmatrix}.$$

In practice, due to the camera noise, the eigenvalues are in general all different from noise; therefore, we select the eigenvetors with the smallest eigenvalues. This eigenvector is then interpreted as an estimation of t. To calibrate both cameras. The output is divided by the estimated gain factors in $\hat{t}$.

The resulting gain factors are estimated such that
i) the camera corrected colors have minimal difference, and
ii) the corrected colors tend to the unknown but common reference colors.

It is important to note that the shared color scene does not mean that the first image and the second image necessarily share a field of view. The shared color scene merely means that either the images depicted an identical object or area and thereby share a field of view or the images merely depict objects of closely matching color without the images sharing a field of view.

Moreover, it is important to note, that in case of color images, the above-described process is separately performed for each different color channel of the images. This means that a separate cost function is minimized for each color channel of the images and a separate color balancing is performed for each individual color channel of the images.

Figure 3:
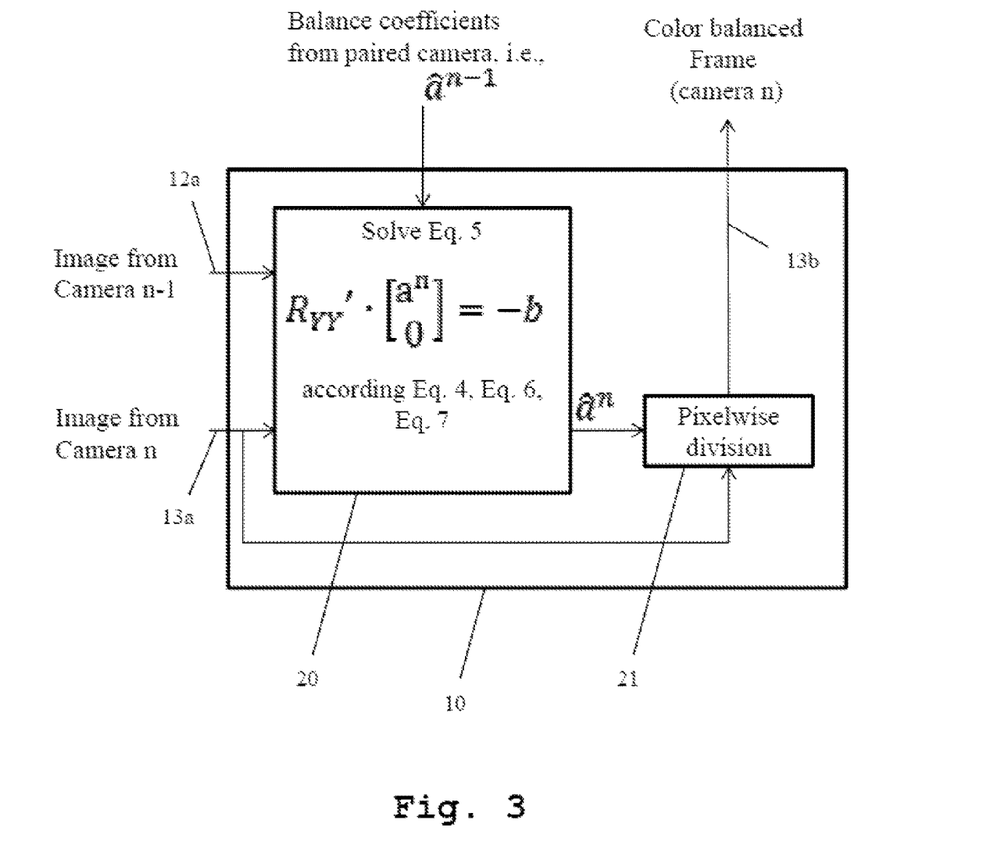
FIG. 3 shows a further embodiment of the first aspect of the disclosure in a block diagram.
Figure 4:
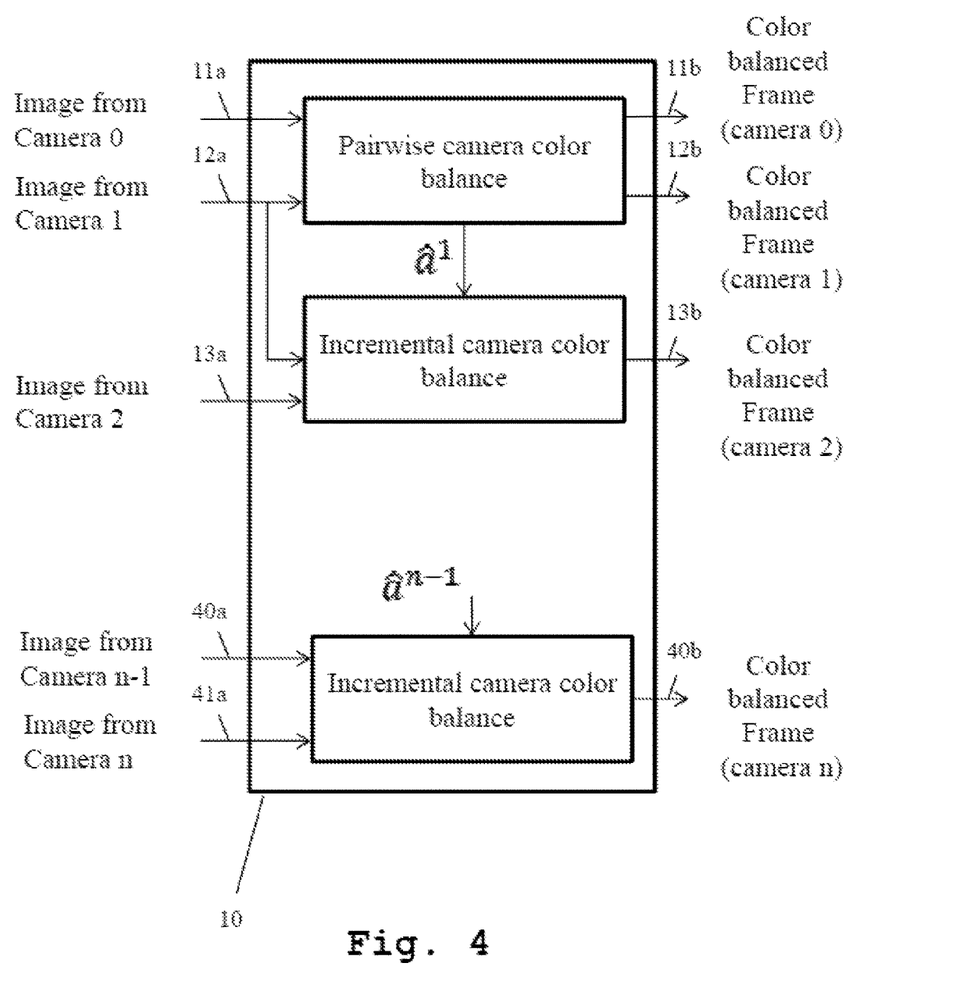
FIG. 4 shows another embodiment of the first aspect of the disclosure in a block diagram.

In FIG. 3, an extension of the above-shown process to more than two images is shown. Especially, FIG. 3 shows a different embodiment of the image processing device 10. The image processing device 10 here also comprises a color balancing determination unit 20 and a color balancing calculation unit 21. For example a color balancing of a first image 11a and a second image 12a as shown in FIG. 2 has already been performed. A gain factor ân−1, which corresponds to the gain factor of the second image 12a is already available. The color balancing determination unit 20 is supplied with the second image 12a, a third image 13a generated by a third camera 13 and the gain factor ân−1 and therefrom computes a further gain factor ân for the third image 13a. This gain factor is handed on to the color balancing calculation unit 21 along with the third image 13a. Therefrom, a color balanced third image 13b is calculated. In the following, the detailed mathematics underlying the briefly-specified process is shown:

Let us assume, we have already estimations of $\hat{a}^{(1)}$ and $\hat{a}^{(2)}$ for all channels of the two cameras. To obtain an estimation for the channels gain $\hat{a}^{(3)}$ by constraining $\hat{a}^{(1)}$ we consider again the nullspace determination problem $$R'_{YY} \begin{bmatrix} a^{(3)} \\ -a^{(1)} \end{bmatrix} = \begin{bmatrix} 0 \\ 0 \end{bmatrix}, \tag{9}$$

with $$R'_{YY} := [y^{(1)} \ y^{(3)}]^T [y^{(1)} \ y^{(3)}]. \tag{10}$$

$$R'_{YY} \left( \begin{bmatrix} a^{(3)} \\ -a^{(1)} \end{bmatrix} - \begin{bmatrix} 0 \\ -a^{(1)} \end{bmatrix} \right) = R'_{YY} \begin{bmatrix} a^{(3)} \\ 0 \end{bmatrix}, \tag{11}$$

$$R'_{YY} \begin{bmatrix} a^{(3)} \\ -a^{(1)} \end{bmatrix} - \underbrace{R'_{YY} \begin{bmatrix} 0 \\ -a^{(1)} \end{bmatrix}}_{:=b} = R'_{YY} \begin{bmatrix} a^{(3)} \\ 0 \end{bmatrix}. \tag{12}$$

With (9), we obtain $$R'_{YY} \begin{bmatrix} a^{(3)} \\ 0 \end{bmatrix} = -b. \tag{13}$$

For an inverse of $R_{YY}'$ that insures, the second coefficient of the unknown vector is 0, we use $$R'^{-1}_{YY} = \begin{bmatrix} \dfrac{1}{r_{yy,11}} & 0 \\ 0 & 0 \end{bmatrix}, \tag{14}$$

With $r_{yy,11}$ the element at the first row and first column of the matrix $R_{YY}'$. Hence, $$\hat{a}^{(3)} = \frac{\hat{a}^{(1)} r_{yy,21}}{r_{yy,11}}, \quad (15)$$

where we employed for $\hat{a}^{(1)}$ in the vector b the estimated value from a previous step.

Given 2 images from paired cameras, the channel gain factors are estimated such that i) the camera corrected colors have minimal difference, and ii) the corrected colors tend to the reference colors.

The calibration itself is done finally by dividing the pixels by the estimating channel gain parameters.

Moreover, in FIG. 4, again the overall structure of the proposed imaging system 1, which allows a calibration of more than two cameras is shown. Here, images 11a, 12a, 13a, 40a, 41a are provided to the image processing device 10, which performs a pairwise color balancing. In this example, the images 11a and 12a are used for generating color balanced images 11b, 12b. A resulting gain factor al is used for performing an incremental color balancing of a third image 13a resulting in a color balanced third image 13b. Accordingly it is continued with further images 40a, 41.

Figure 5:
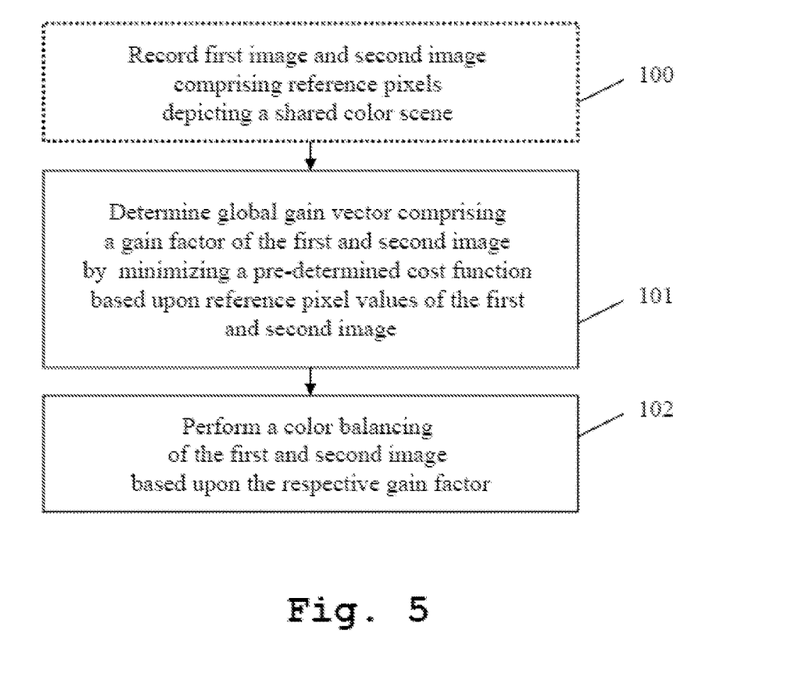
FIG. 5 shows an embodiment of the third aspect of the disclosure in a flow chart.

In FIG. 5, an embodiment of the third aspect of the disclosure is shown. In an optional first step 100, at least first and second images 11a, 12a are recorded. The images comprise a shared color scene, as described earlier.

In a second step 101, a global gain vector t comprising a gain factor ân of the first image 11a and a gain factor ân+1 of the second image 12a is determined by minimizing a cost function based upon reference pixel values from the first and second images 11a, 12a.

In a third step 102, a color balancing of the first and second images 11a, 12a is performed using the respective gain factors ân, ân+1.

Regarding the details of the individual steps, it is also referred to the elaborations regarding FIG. 1-4.

The disclosure is not limited to the examples and especially not to a specific number of images. Also the disclosure is not limited to images with or without overlapping fields of view. The characteristics of the exemplary embodiments can be used in any combination.

The disclosure has been described in conjunction with various embodiments herein. However, other variations to the disclosed embodiments can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage.

Embodiments of the disclosure may be implemented in a computer program for running on a computer system, at least including code portions for performing steps of a method according to the disclosure when run on a programmable apparatus, such as a computer system or enabling a programmable apparatus to perform functions of a device or system according to the disclosure.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via PO devices.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Thus, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the disclosure is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

What is claimed is:

1. An image processing device for performing a color balancing of at least a first image recorded by a first camera and a second image recorded by a second camera, the image processing device comprising one or more processors adapted to:
   determine a global gain vector (t) comprising at least one gain factor ($\hat{a}^n$) of the first image and at least one gain factor ($\hat{a}^{n+1}$) of the second image by minimizing a pre-determined cost function based upon reference pixel values of the first image and reference pixel values of the second image, wherein the first and second image reference pixels depict a shared color scene of the first and second images;
   perform a color balancing of the first image based upon the at least one gain factor ($\hat{a}^n$) of the first image; and
   perform a color balancing of the second image based upon the at least one gain factor ($\hat{a}^{n+1}$) of the second image, wherein minimizing the pre-determined cost function comprises minimizing $J'=[y_j^{(1)} y_j^{(2)}][a^{(2)} - a^{(1)}]^T,$ wherein J' is the predetermined cost function, T is a transpose, j is a pixel number, $y_j^{(1)}$ is a value of pixel number j measured by the first camera, $y_j^{(2)}$ is a value of pixel number j measured by the second camera, $a^{(1)}$ is a gain factor by which a reference color value of the pixel j has to be multiplied to equal $y_j^{(1)}$, and $a^{(2)}$ is a gain factor by which the reference color value of the pixel j has to be multiplied to equal $y_j^{(2)}$.

2. The image processing device according to claim 1, wherein the first image and the second image each comprise at least three color channels, and wherein the one or more processors are further adapted to:
   minimize separate cost functions for each color channel of the images;
   perform the color balancing of the first image separately for each color channel; and
   perform the color balancing of the second image separately for each color channel.

3. The image processing device according to claim 1, wherein the shared color scene of the first image and the second image is a scene that captures at least one same object or area, and
   wherein the at least one same object or area is within a shared field of view of the first camera and the second camera.

4. The image processing device according to claim 1, wherein the shared color scene of the first image and the second image is a scene that captures at least one same color, and
   wherein the at least one same color is not within a shared field of view of the first camera and the second camera.

5. The image processing device according to claim 1, wherein the image processing device is adapted to perform a color balancing of at least the first image recorded by the first camera, the second image recorded by the second camera, and a third image recorded by a third camera,
   wherein the one or more processors, after performing the color balancing of the first image and the second image, resulting in a color balanced first image and a color balanced second image, are further adapted to:
      determine a further global gain vector comprising at least one further gain factor of the second image and at least one gain factor of the third image by minimizing a pre-determined cost function based upon reference pixel values of the second color balanced image and reference pixel values of the third image, wherein the reference pixels of the color balanced second image and the third image depict a shared color scene of the color balanced second image and the third image;
      perform a color balancing of the second color balanced image based upon the at least one further gain factor of the second image; and
      perform a color balancing of the third image based upon the at least one gain factor of the third image.

6. The image processing device according to claim 1, wherein a global gain vector t is assumed to achieve $J = Y \cdot t$, where $Y = [y^{(1)} \; y^{(2)}],$ $y^{(n)} = [y_1^{(n)} \ldots y_i^{(n)} \ldots y_l^{(n)}]^T,$ and $t = [a^{(2)} - a^{(1)}]^T,$ wherein t is the global gain vector, Y is a vector of values y measured for a single pixel by first camera and the second camera, n is a pixel number, i is an intermediary pixel number, and 1 is a last pixel number, and minimizing the pre-determined cost function comprises determining a non-trivial nullspace of a matrix $R_{yy} = Y^T \cdot Y$ by preferably performing an eigenvalue decompositon of $R_{yy}$ $R_{yy} = \hat{A} \cdot R_{yy} \cdot \hat{A}^T,$ wherein Ryy is a diagonal matrix with the eigenvalues at its main diagonal, and $\hat{A}$ is a unitary matrix, and using the eigenvectors with the smallest eigenvalues $\hat{t}$ as the first color balancing information $\hat{a}^{(1)}$ and the second color balancing information $\hat{a}^{(2)}$, wherein $$\hat{t}=[\hat{a}^{(2)}-\hat{a}^{(1)}]^T.$$

7. The image processing device according to claim 6, wherein performing of the color balancing comprises:
dividing pixel values $y_j^{(1)}$ of the first camera by the gain factor $\hat{a}^{(1)}$, and
dividing pixel values $y_j^{(1)}$ of the second camera by the gain factor $\hat{a}^{(2)}$.

8. An imaging system comprising:
a first camera;
a second camera; and
an image processing device comprising one or more processors adapted to:
determine a global gain vector (t) comprising at least one gain factor ($\hat{a}''$) of the first image and at least one gain factor ($\hat{a}''^{+1}$) of the second image by minimizing a pre-determined cost function based upon reference pixel values of the first image and reference pixel values of the second image, wherein the first and second image reference pixels depict a shared color scene of the first and second images;
perform a color balancing of the first image based upon the at least one gain factor ($\hat{a}''$) of the first image; and
perform a color balancing of the second image based upon the at least one gain factor ($\hat{a}''^{+1}$) of the second image,
wherein minimizing the pre-determined cost function comprises minimizing $$J'=[y_j^{(1)} y_j^{(2)}][a^{(2)}-a^{(1)}]^T,$$

wherein J' is the predetermined cost function T is a transpose j is a pixel number $y_j^{(1)}$ is a value of pixel number j measured by the first camera, $y_1^{(2)}$ is a value of pixel number j measured by the second camera, $a^{(1)}$ is a gain factor by which a reference color value of the pixel j has to be multiplied to equal $y_j^{(1)}$ and $a^{(2)}$ is a gain factor by which the reference color value of the pixel j has to be multiplied to equal $y_j^{(2)}$.

9. The imaging system according to claim 8,
wherein the first camera and the second camera have an at least partially shared field of view.

10. The imaging system according to claim 8, further comprising a third camera.

11. The imaging system according to claim 10,
wherein each of the cameras has at least a partially shared field of view with at least one other of the cameras.

12. An image processing method for performing a color balancing of at least a first image recorded by a first camera and a second image recorded by a second camera,
the method comprising:
determining a global gain vector (t) comprising at least one gain factor ($\hat{a}''$) of the first image and at least one gain factor ($\hat{a}''^{+1}$) of the second image by minimizing a pre-determined cost function based upon reference pixel values of the first image and reference pixel values of the second image, wherein the first and second image reference pixels depict a shared color scene of the first and second images;
performing a color balancing of the first image based upon the at least one gain factor ($\hat{a}''$) of the first image; and
performing a color balancing of the second image based upon the at least one gain factor ($\hat{a}''^{+1}$) of the second image,
wherein minimizing the pre-determined cost function comprises minimizing $$J'=[y_j^{(1)} y_j^{(2)}][a^{(2)}-a^{(1)}]^T,$$

wherein J' is the predetermined cost function, T is a transpose, j is a pixel number, $y_j^{(1)}$ is a value of pixel number j measured by the first camera $y_1^{(2)}$ is a value of pixel number j measured by the second camera, $a^{(1)}$ is a gain factor by which a reference color value of the pixel j has to be multiplied to equal $y_j^{(1)}$ and $a^{(2)}$ is a gain factor by which the reference color value of the pixel j has to be multiplied to equal $y_j^{(2)}$.

13. A non-transitory computer readable medium comprising a program code for performing a color balancing of at least a first image recorded by a first camera and a second image recorded by a second camera when the program code runs on a computer, the computer is configured to perform steps comprising:
determining a global gain vector (t) comprising at least one gain factor ($\hat{a}''$) of the first image and at least one gain factor ($\hat{a}''^{+1}$) of the second image by minimizing a pre-determined cost function based upon reference pixel values of the first image and reference pixel values of the second image, wherein the first and second image reference pixels depict a shared color scene of the first and second images;
performing a color balancing of the first image based upon the at least one gain factor ($\hat{a}''$) of the first image; and
performing a color balancing of the second image based upon the at least one gain factor ($\hat{a}''^{+1}$) of the second image,
wherein minimizing the pre-determined cost function comprises minimizing $$J'=[y_j^{(1)} y_j^{(2)}][a^{(2)}-a^{(1)}]^T,$$

wherein J' is the predetermined cost function, T is a transpose, j is a pixel number, $y_j^{(1)}$ is a value of pixel number j measured by the first camera, $y_1^{(2)}$ is a value of pixel number j measured by the second camera, $a^{(1)}$ is a gain factor by which a reference color value of the pixel j has to be multiplied to equal $y_j^{(1)}$, and $a^{(2)}$ is a gain factor by which the reference color value of the pixel j has to be multiplied to equal $y_j^{(2)}$.

* * * * *